(12) United States Patent
Gordon et al.

(10) Patent No.: US 11,149,781 B2
(45) Date of Patent: Oct. 19, 2021

(54) RELEASE CABLE LOCKOUT MECHANISM

(71) Applicant: GM GLOBAL TECHNOLOGY OPERATIONS LLC, Detroit, MI (US)

(72) Inventors: Dresdan T. O. Gordon, Ortonville, MI (US); James N. Nelsen, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 274 days.

(21) Appl. No.: 16/423,607

(22) Filed: May 28, 2019

(65) Prior Publication Data
US 2020/0378432 A1 Dec. 3, 2020

(51) Int. Cl.
*F16C 1/20* (2006.01)
*F16C 1/10* (2006.01)
*E05D 11/10* (2006.01)

(52) U.S. Cl.
CPC ............ *F16C 1/20* (2013.01); *E05D 11/1014* (2013.01); *F16C 1/106* (2013.01)

(58) Field of Classification Search
CPC ........ F16C 1/20; F16C 1/106; F16C 2326/01; F16C 1/262; F16C 1/101; F16C 1/102; E05D 11/1014; E05B 79/20; E05B 83/24; B60R 21/38; F16J 10/02; F16F 9/0281; F15B 15/22; F15B 15/19
See application file for complete search history.

(56) References Cited

U.S. PATENT DOCUMENTS

| | | | |
|---|---|---|---|
| 8,616,594 B2 * | 12/2013 | Shimura | E05B 83/36 |
| | | | 292/336.3 |
| 2004/0004357 A1 * | 1/2004 | Arlt | E05B 81/68 |
| | | | 292/201 |
| 2018/0371806 A1 * | 12/2018 | Jeong | E05B 81/14 |
| 2019/0017298 A1 * | 1/2019 | Sardelli | E05B 77/34 |
| 2019/0092273 A1 * | 3/2019 | Miller | E05B 83/24 |
| 2020/0190869 A1 * | 6/2020 | P | E05B 85/04 |

FOREIGN PATENT DOCUMENTS

| | | | | |
|---|---|---|---|---|
| DE | 102018123240 A1 * | 3/2019 | ............ | B60R 21/38 |
| FR | 2755991 | * | 5/1998 | |

OTHER PUBLICATIONS

EPO Machine Translation of FR 2755991 A1, Luc et al., May 22, 1998 (Year: 1998).*

* cited by examiner

*Primary Examiner* — Vinh Luong
(74) *Attorney, Agent, or Firm* — Quinn IP Law

(57) ABSTRACT

A cable release system configured to actuate a latch mechanism includes a cable arrangement configured to shift in response to an actuation force. The shifting of the cable arrangement is thereby configured to actuate the latch mechanism. The cable release system also includes a lockout mechanism configured to selectively impede shifting of the cable arrangement in response to the actuation force. Such selective impeding of the shifting of the cable arrangement is thereby configured to prevent actuation of the latch mechanism. A vehicle may employ the cable release system configured to actuate a latch mechanism to thereby unlatch a panel from the vehicle body.

18 Claims, 6 Drawing Sheets

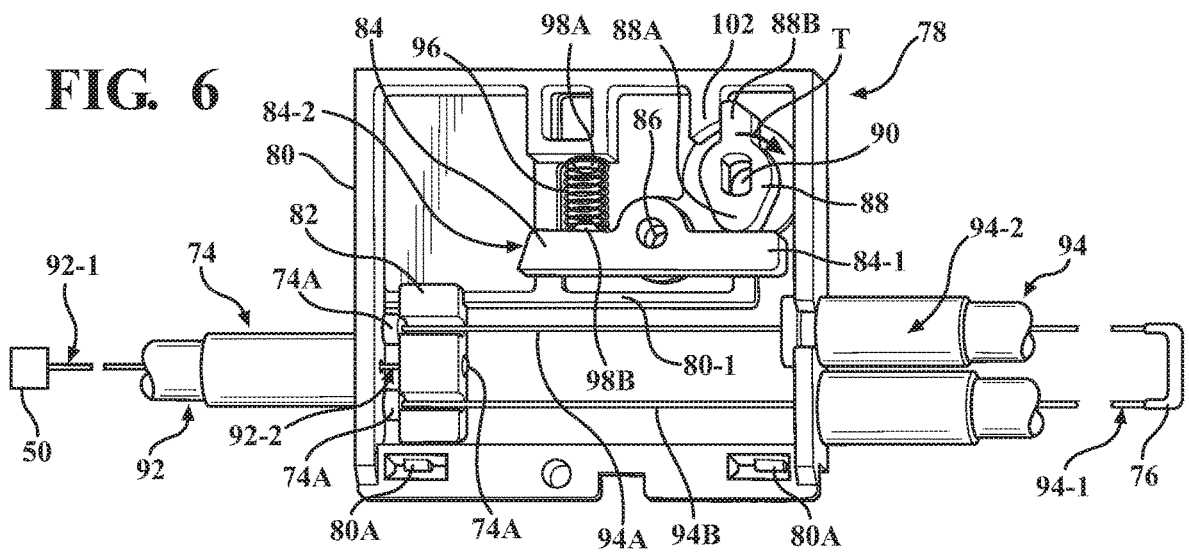
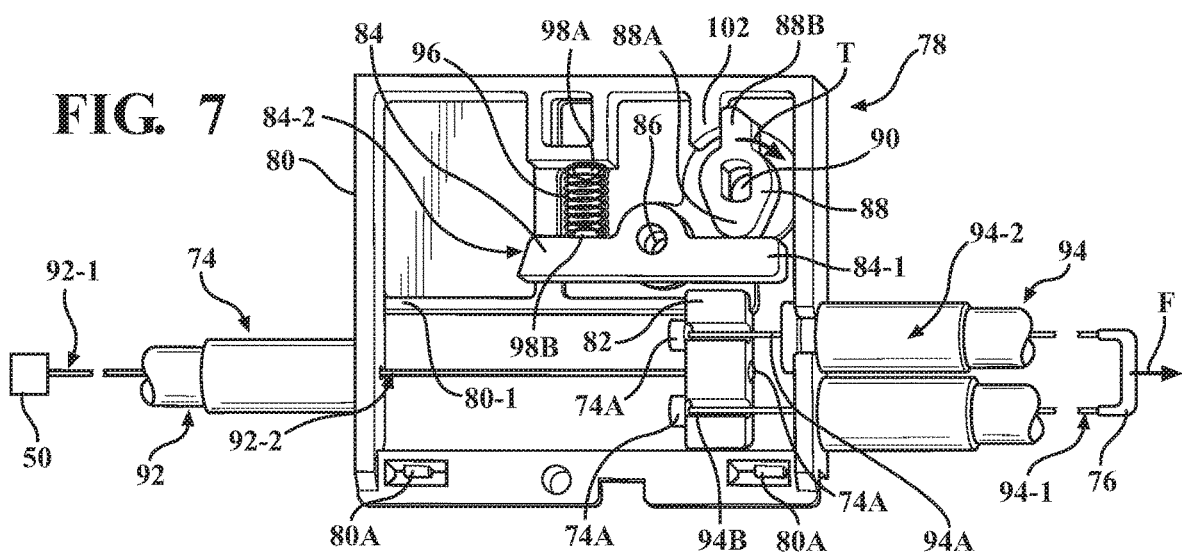
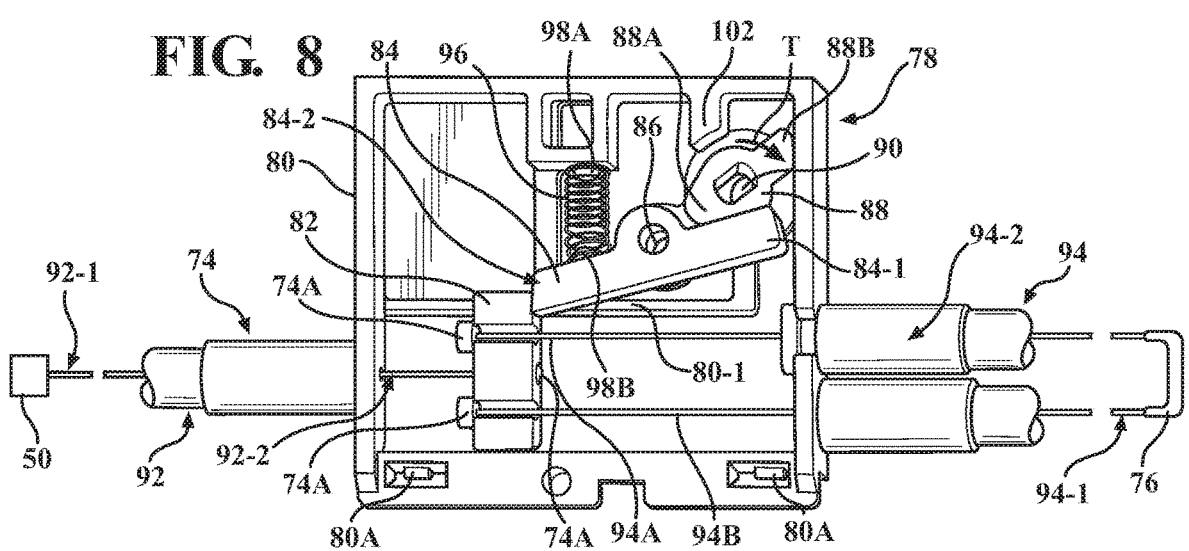

RELEASE CABLE LOCKOUT MECHANISM

INTRODUCTION

The disclosure relates to a lockout mechanism for a motor vehicle release cable.

A Bowden or actuation cable is a type of flexible cable used to transmit mechanical force or energy by the movement of an inner cable relative to a hollow outer cable housing. The housing generally has a composite construction, consisting of an inner lining, a longitudinally incompressible layer such as a helical winding or a sheaf of steel wire, and a protective outer covering.

The linear movement of the inner cable is most often used to transmit a pulling force, although push/pull cables have also been used, e.g., as transmission gear-shift cables. A push/pull Bowden cable may also be used for throttle control. In such applications, the inner element may be a solid wire, rather than a multi-strand cable.

In motor vehicles, actuation cables may be used to release latches maintaining closure of various compartments. Examples of such compartments include a power-plant compartment hood and a trunk lid. Such actuation cables may be triggered by levers or handles located inside a passenger compartment of the vehicle. Additionally, as noted above, actuation cables may be used to control powerplant throttles or for affecting transmission gear-changes.

SUMMARY

A cable release system configured to actuate a latch mechanism includes a cable arrangement configured to shift in response to an actuation force. The shifting of the cable arrangement is thereby configured to actuate the latch mechanism. The cable release system also includes a lockout mechanism configured to selectively impede shifting of the cable arrangement in response to the actuation force. Such selective impeding of the shifting of the cable arrangement is thereby configured to prevent actuation of the latch mechanism.

The lockout mechanism may include a housing configured to mount therein a shiftable mounting block and a pivotable stop lever. The lockout mechanism may also include a cam lever configured to maintain the stop lever from pivoting into contact with the mounting block. The cable arrangement may include a first cable having a first end connected to the latch mechanism and a second end extending into the housing and connected to the mounting block. The cable arrangement may additionally include at least one second cable having a first end configured to accept the actuation force and a second end extending into the housing and connected to the mounting block.

The at least one second cable may include two cables connected to the mounting block.

The housing may include a guide feature configured to guide a shift of the mounting block relative to the housing.

The lockout mechanism may additionally include a bias spring configured to urge the stop lever to pivot into contact with the mounting block. The subject urging of the stop lever by the bias spring is thereby configured to impede the shift of the mounting block and the shifting of the cable arrangement relative to the housing.

The bias spring may operate between the housing and the stop lever.

Each of the housing and the stop lever may include a respective locating feature configured to position and preload the bias spring within the housing.

The lockout mechanism may additionally include an electric actuator configured to actuate the cam lever and thereby permit the stop lever to pivot into contact with the mounting block.

The housing may include a stop feature defining a limit position and travel of the cam lever.

The stop lever may include a stop lever first end, a stop lever second end, and a pivot arranged between the stop lever first end and the stop lever second end. In such an embodiment, the bias spring may act on the stop lever first end, while the cam lever may act on the stop lever second end.

A vehicle employing the above-disclosed cable release system and configured to actuate a latch mechanism to thereby unlatch a panel from the vehicle body is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 6 is a schematic close-up partial perspective view of the lockout mechanism shown in FIG. 2, the lockout mechanism depicted in a neutral or non-actuated state and the cable release system enabled to actuate the latch mechanism, according to the present disclosure.

FIG. 7 is a schematic close-up partial perspective view of the lockout mechanism shown in FIG. 6, the lockout mechanism depicted in a neutral or non-actuated state and the cable release system actuating the latch mechanism, according to the present disclosure.

FIG. 8 is a schematic close-up partial perspective view of the lockout mechanism shown in FIG. 7, the lockout mechanism depicted in an actuated state and the cable release system being impeded from actuating the latch mechanism, according to the present disclosure.

DETAILED DESCRIPTION

Figure 1:
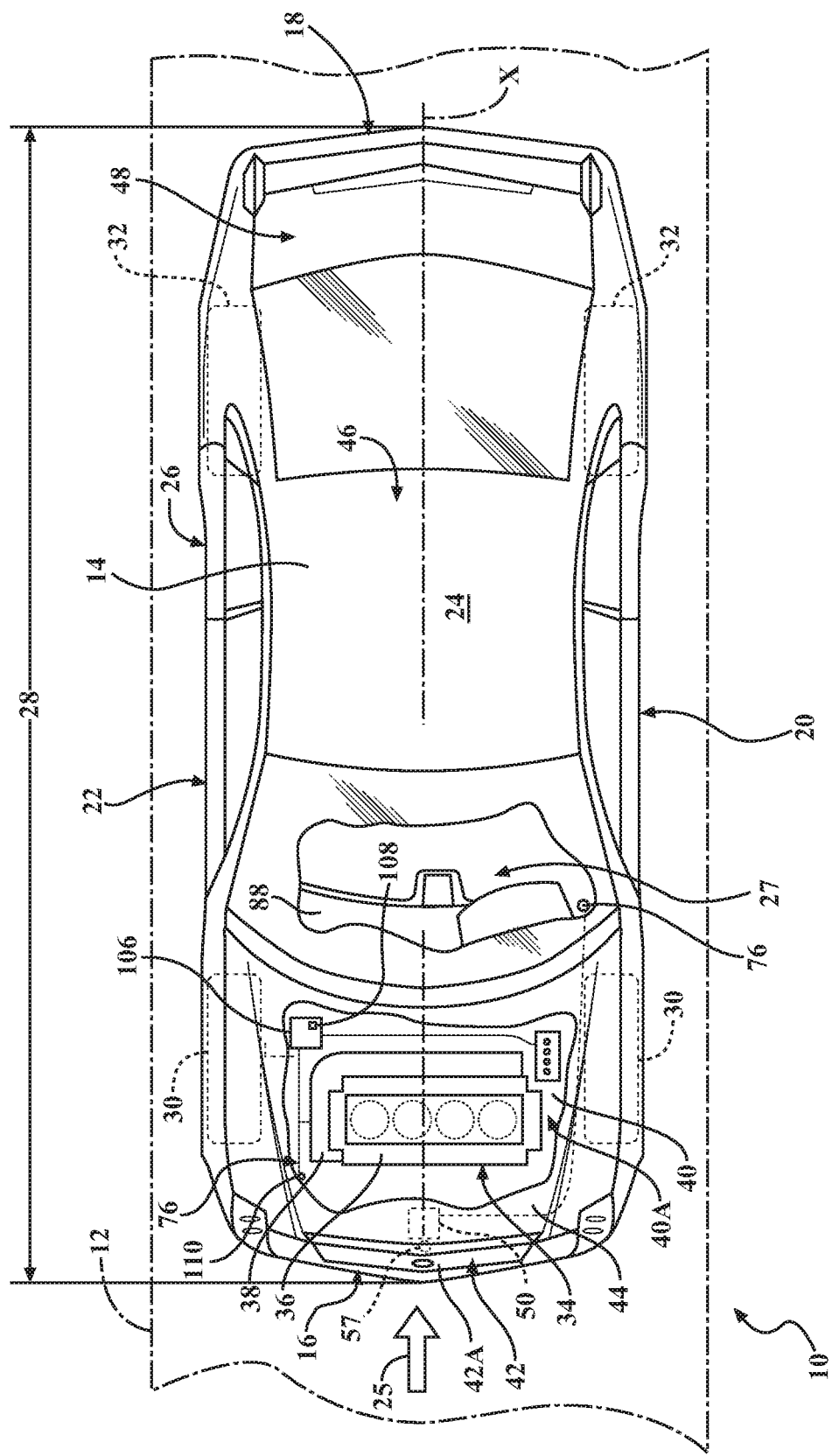
FIG. 1 is a schematic top view of a vehicle showing a partially sectioned hood panel and an under-hood compartment covered thereby, a latch mechanism configured to selectively fasten the hood panel to the body of the vehicle, according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 having a longitudinal axis X. The vehicle body 14 generally defines six body sides. The six body sides include a first body end or front end 16, an opposing second body end or rear end 18, a left side or section 20, and a right side 22, a top body section 24, and an underbody section 26. The front end 16 is configured to face oncoming or incident, i.e., approaching and contacting, ambient airflow 25, for example, when the vehicle is in motion relative to the road surface 12. The vehicle body 14 also defines a passenger compartment 27.

Each of the left side, right side, top, and underbody body sections, 20, 22, 24, and 26, respectively, is configured to span a distance 28 between the front and rear ends 16, 18 of the body 14. As shown in FIG. 1, the vehicle 10 also includes a plurality of road wheels arranged between the first and second vehicle body ends 16, 18, proximate the left and right sides 20, 22, specifically front wheels 30 and rear wheels 32. The vehicle 10 also includes a powertrain 34 that includes a power-plant 36, such as an internal combustion engine (as shown) or a traction electric motor (not shown), for generating power-plant torque. The powertrain 34 may also include a transmission 38 operatively connecting the power-plant 36 to at least some of the road wheels 30, 32 for transmitting power-plant torque thereto and thereby put the vehicle 10 in motion.

The vehicle body 14 defines a compartment 40 for housing the powertrain 34. As shown, the vehicle body 14 also includes a vehicle fascia 42 arranged at the front end 16. The fascia 42 defines an opening 42A configured to receive at least some of the oncoming ambient airflow 25, which may be used for cooling the powertrain 34. The vehicle 10 also includes a hood panel or bonnet 44 configured to cover the compartment 40 and thereby define an under-hood compartment 40A (shown in FIGS. 1 and 2) for housing the powertrain 34. The vehicle 10 may also include a vehicle roof 46 and a trunk lid 48. Although the powertrain 34 is shown as arranged proximate the front end 16, such that the vehicle 10 has a front-engine configuration, the powertrain 34 may, alternatively, be arranged proximate the rear end 18, such that the vehicle 10 has a mid- or rear-engine configuration. Corresponding to the specifically shown front-engine configuration of the vehicle 10, the hood panel 44 is depicted as arranged generally proximate the front end 16, while the trunk lid 48 is arranged generally proximate the rear end 18.

Figure 2:
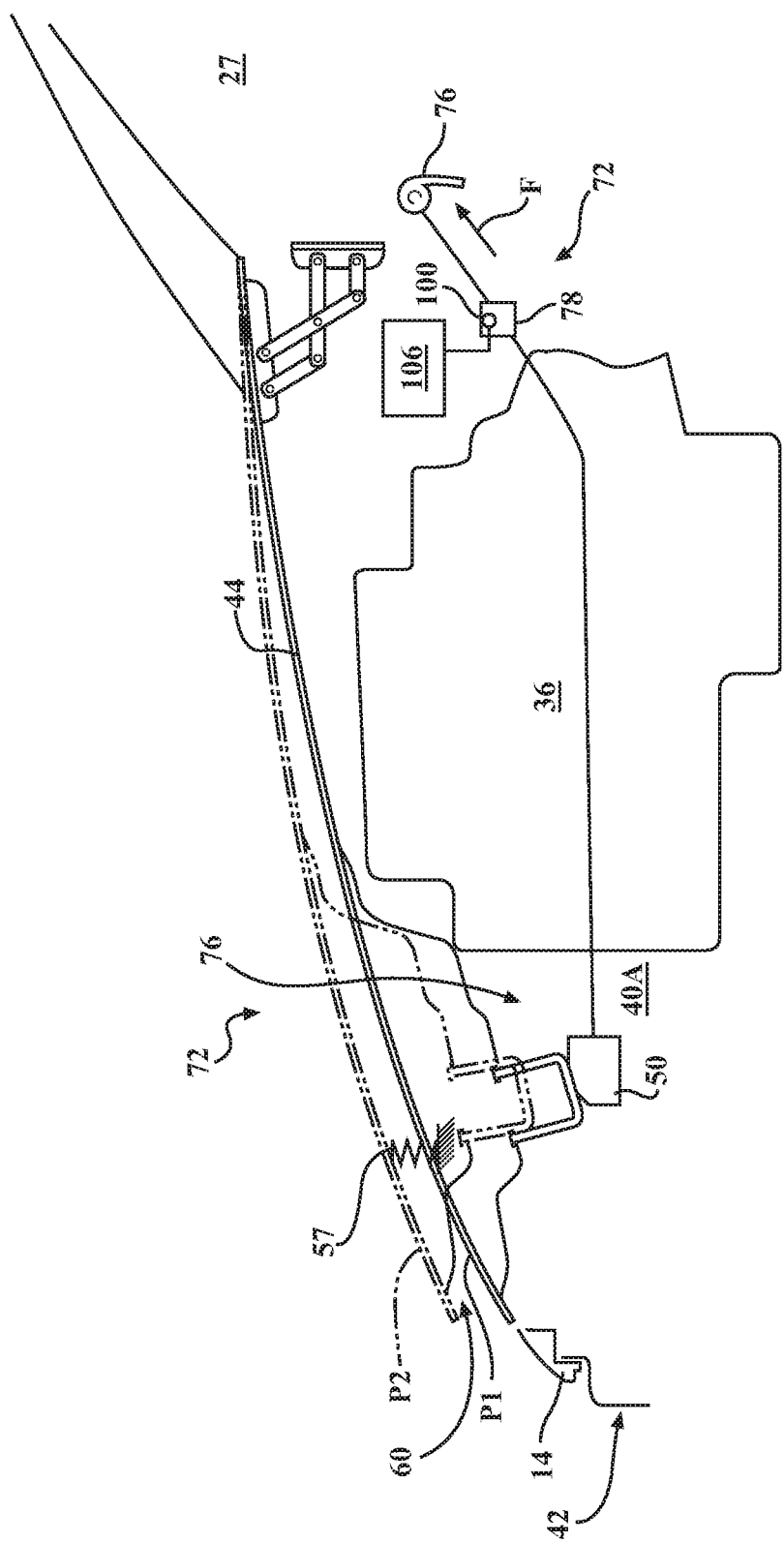
FIG. 2 is a schematic close-up partial side view of the vehicle shown in FIG. 1, including a view of a cable release system having a lockout mechanism and configured to selectively actuate the latch mechanism.

Although the vehicle 10 may include other compartments, such as the trunk, within the scope of the present disclosure, the following description will concentrate on the underhood compartment defined by the vehicle body and housing the power-plant 36 and the hood panel 44 configured to cover the subject compartment 40. FIG. 2 shows the hood panel 44 in its fully-closed position. As shown, the vehicle 10 also includes a latch mechanism 50 (shown schematically in FIGS. 1 and 2, and in detail in FIG. 3) configured to selectively fasten the hood panel 44 to the vehicle body 14 such that the hood panel maintains closure of the compartment 40. Although the remainder of the present disclosure primarily concentrates on a front latching (shown in FIG. 1), i.e., proximate the fascia 42, hood panel 44, the present disclosure is similarly applicable to a rear latching (not shown), i.e., proximate the passenger compartment 27, hood panel.

Figure 3:
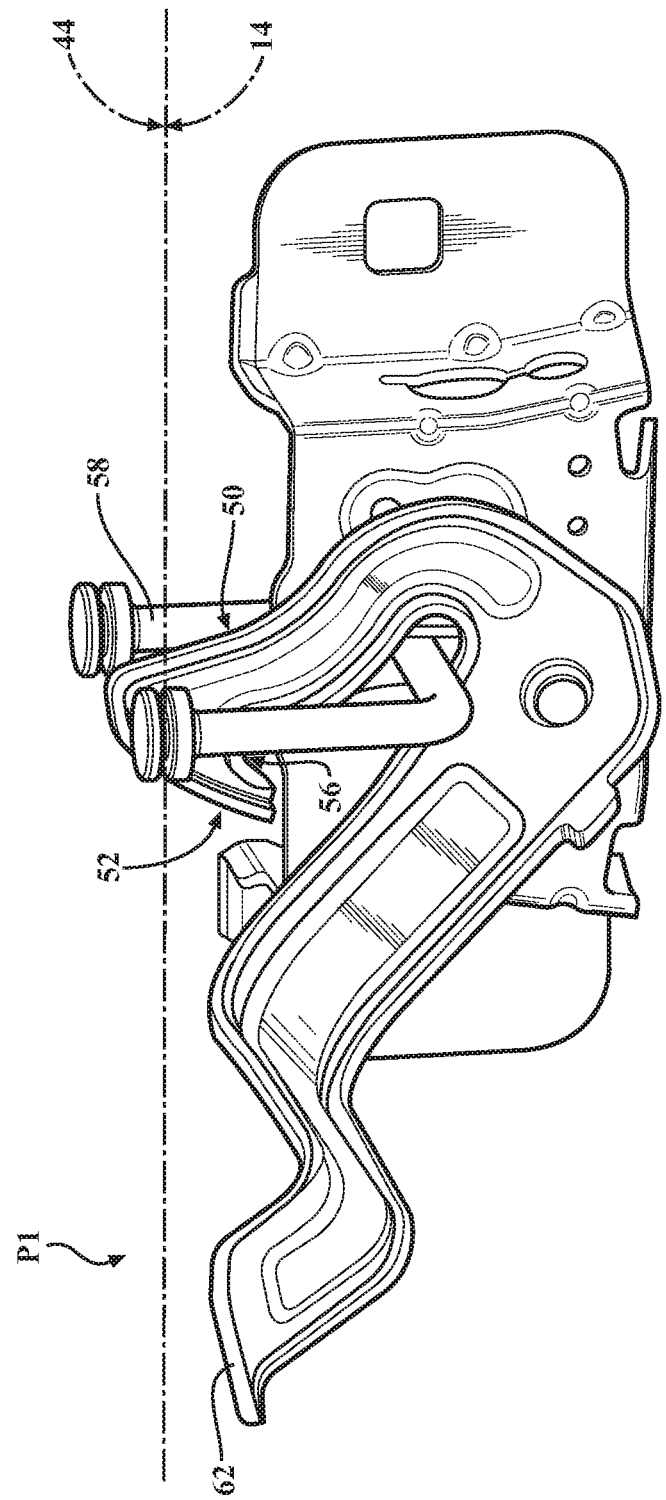
FIG. 3 is a schematic close-up perspective partial view of the vehicle shown in FIGS. 1 and 2 from the perspective of a vehicle fascia, including a detailed view of the latch mechanism having a pivotable latch shown fastening the hood panel to the body of the vehicle in a first hood position.
Figure 4:
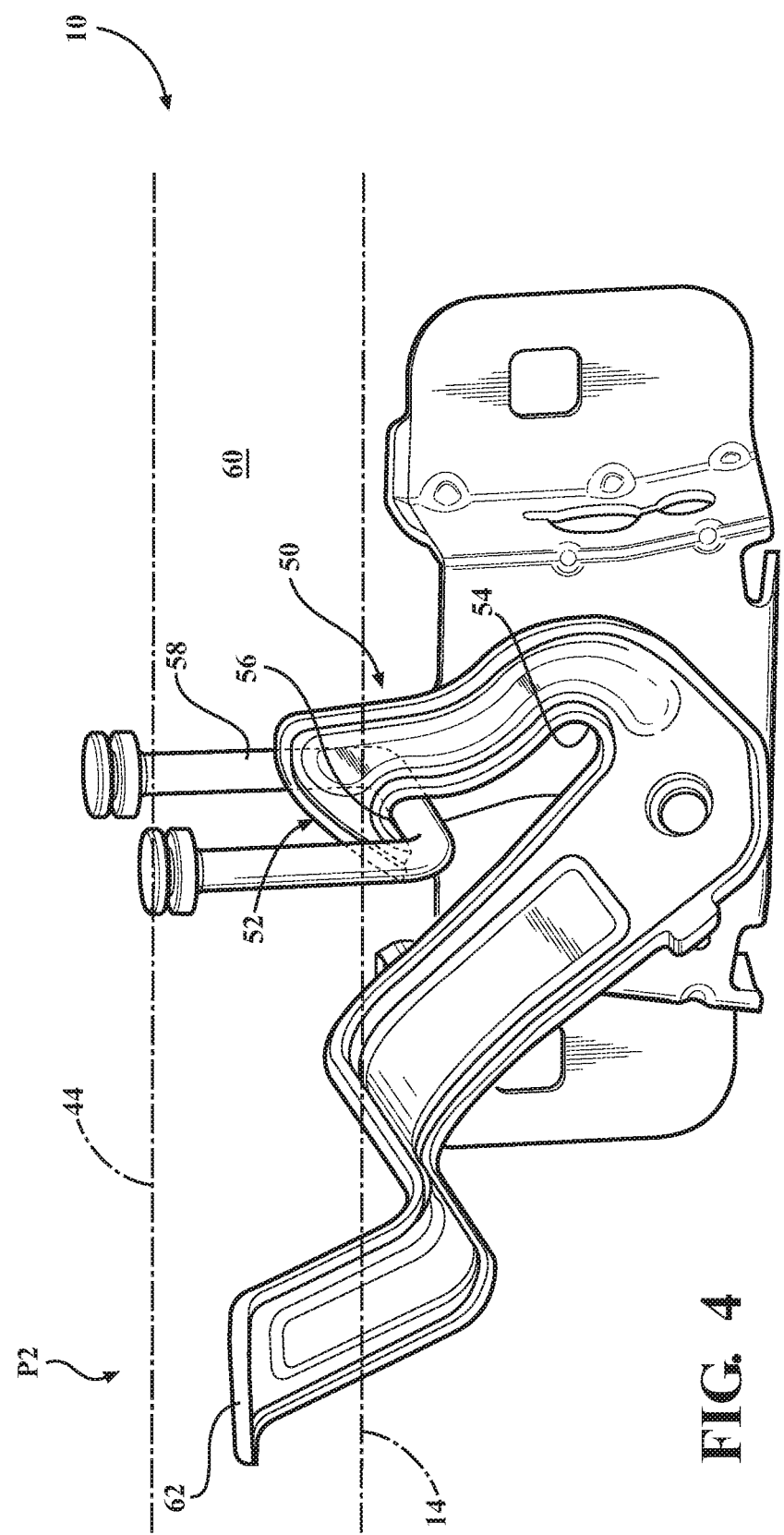
FIG. 4 is a schematic close-up partial perspective view of the mechanism shown in FIG. 3, the latch mechanism depicted maintaining the hood panel in a second hood position, wherein the hood panel is spaced apart from the vehicle body.
Figure 5:
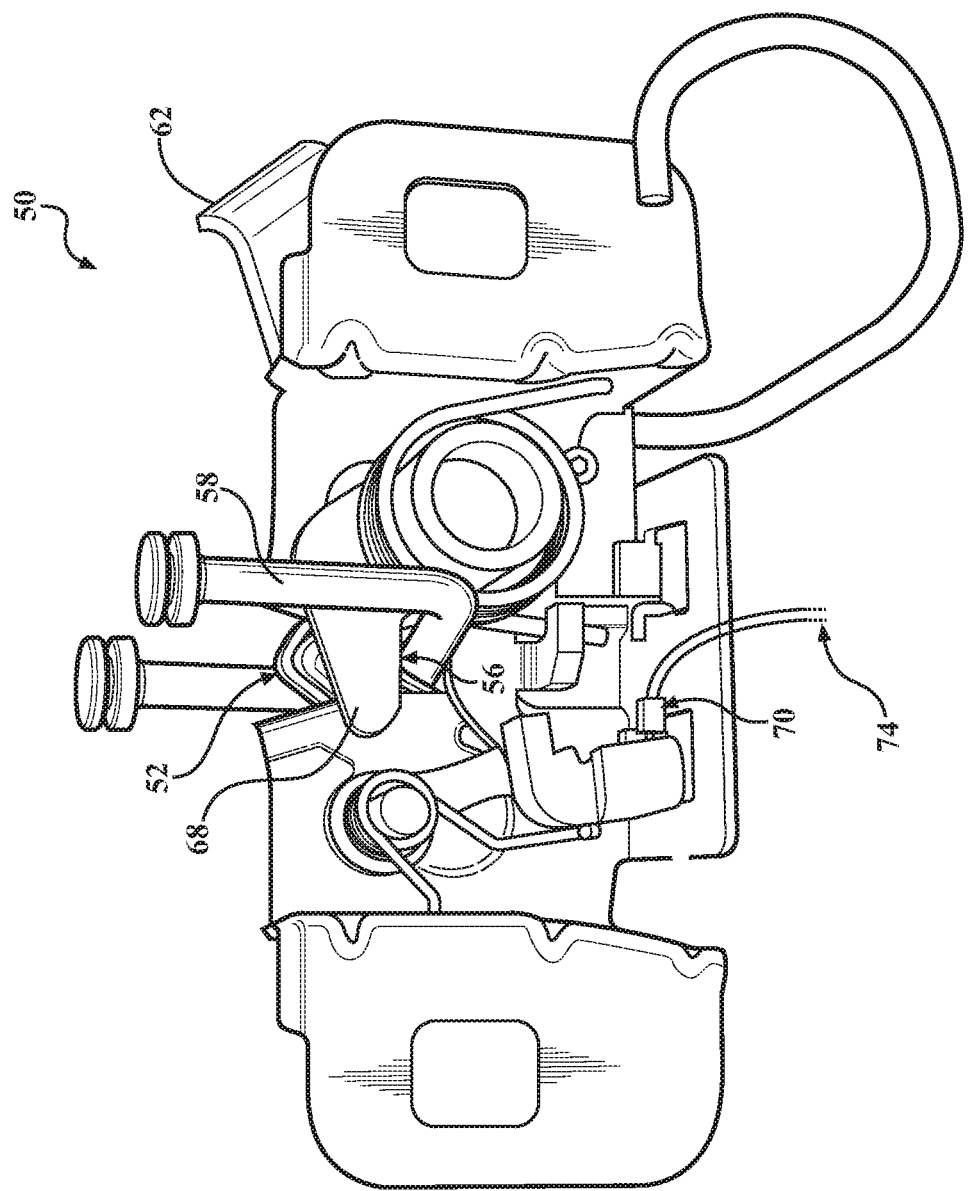
FIG. 5 is a schematic close-up partial perspective view of the latch mechanism shown in FIG. 3, the mechanism depicted in the first hood position from the perspective of a vehicle passenger compartment.

FIG. 3 illustrates the latch mechanism 50 in detail from the perspective of the vehicle fascia 42. As shown in FIG. 3, the latch mechanism 50 includes a pivotable latch 52 having a primary catch portion 54 configured to facilitate or maintain closure of the under-hood compartment 40A via the hood panel 44 being pulled against the vehicle body 14 in a first hood position P1. The pivotable latch 52 also includes a secondary catch portion 56 configured to limit, such as constrain and/or maintain, the hood panel 44 in a second hood position P2 (shown in FIGS. 2 and 4). As shown in FIGS. 3-5, the latch mechanism 50 additionally includes a striker 58 configured to cooperate with the latch 52. In an embodiment where the pivotable latch 52 is mounted to the vehicle body 14, the striker 58 may be fixed to the hood panel 44. Alternatively, where the pivotable latch 52 is mounted to the hood panel 44, the striker 58 may be fixed to the vehicle body 14. As shown in FIGS. 1-2, the vehicle 10 may also include one or more resilient elements 57 configured to urge the hood panel 44 from the first hood position P1 to the second hood position P2, and maintain the hood panel 44 in the second position.

The position of the hood panel 44 is specifically maintained in the second hood position P2 by an engagement between the secondary catch portion 56 and the striker 58 (shown in FIG. 4). The second hood position P2 is generally configured to provided access to a release handle 62, which may be part of the pivotable latch 52 or otherwise located proximate the vehicle fascia 42. The release handle 62 is configured as a lever for shifting the secondary catch portion 56 out of position where it traps the striker 58. The previously described engagement between the secondary catch portion 56 and the striker 58 (shown in FIG. 4) also permits the release handle 62 to be exposed for access by an operator within the opening 60, such as a vehicle maintenance technician, and facilitate a release of the secondary catch portion 56 to uncover the under-hood compartment 40A via the hood panel 44. Although not specifically shown, the latch mechanism 50 also includes a resilient element, such as a clock spring, configured to preload the pivotable latch 52 such that during respective engagement of the primary catch portion 54 and the secondary catch portion 56 each catch portion maintains contact with the striker 58.

FIG. 5 illustrates the latch mechanism 50 from its back-side, for example, from the perspective of the passenger compartment 27. As shown, the latch mechanism 50 may also include a fork bolt 68 configured to capture the striker 58 and thereby fasten the hood panel 44 to the vehicle body 14. The latch mechanism may 50 additionally include a device 70 configured to release the fork bolt 68. For example, as shown in FIG. 5, the device 70 may be a lever with a catch actuated remotely by the operator of the vehicle 10. The release of the fork bolt 68 is intended to free the hood panel 44 for separation from the vehicle body 14 into the second hood position P2, and thereby establish the opening 60 between the vehicle body and the hood panel. Such release of the fork bolt 68 may be accomplished remotely from the vehicle's passenger compartment 27 via a cable release system 72 to be described in detail below.

The cable release system 72 is specifically configured to actuate the latch mechanism 50 to unlatch the hood panel 44 from the vehicle body 14. The cable release system 72 includes a cable arrangement 74 configured to shift in response to a generally pulling actuation force F, and thereby actuate the latch mechanism 50. The actuation force F may be provided by a release lever or handle 76 arranged in the vehicle's passenger compartment 27, thus permitting remote release of the pivotable latch 52 and facilitate shifting of the hood panel 44 from the first hood position P1 to the second hood position P2. The cable release system 72 also includes a lockout mechanism 78 configured to selectively block or impede shifting of the cable arrangement 74 in response to the actuation force F, and thereby prevent actuation of the latch mechanism 50.

FIGS. 6-8 depict a close-up view of the lockout mechanism 78. Specifically, FIG. 6 depicts the lockout mechanism 78 in a neutral or non-actuated state with the cable release system 72 enabled to actuate the latch mechanism 50. FIG. 7 depicts the lockout mechanism 78 remaining in its non-actuated state and the latch mechanism 50 being actuated by the cable release system 72 via the application of the force F. FIG. 8 depicts the cable release system 72 being impeded from actuating the latch mechanism 50 via the lockout mechanism 78.

As shown in FIGS. 6-8, the lockout mechanism 78 includes a housing 80 configured to mount therein a shiftable or sliding mounting block 82. Although the housing 80 is generally configured, i.e., designed and constructed, to encase various components arranged therein, for clarity FIGS. 6-8 depict a partial view of the housing. The housing 80 may be constructed, such as cast or molded, from multiple sections configured to be joined and maintained together, such as via screws (not shown) or snap fasteners 80A. The housing 80 also mounts therein a pivotable stop lever 84. As shown, the stop lever 84 includes a pivot 86, which may be defined by a post. The pivot 86 is arranged between a stop lever first end 84-1 and a stop lever second end 84-2. Such a post may be an integral feature of the housing 80 or a separate component mounted thereto.

The housing 80 additionally mounts therein a cam lever 88. The cam lever 88 is configured to maintain the stop lever 84 from pivoting into contact with the mounting block 82. As shown, the cam lever 88 is configured to be turned via a keyed drive shaft 90, which is configured to extend through the housing 80. As shown, the cable arrangement 74 is generally a Bowden cable and includes a first cable 92 having a first end 92-1 connected to the latch mechanism 50 and a second end 92-2 extending into the housing 80 and connected to the mounting block 82. The first cable 92 may extend through the mounting block 82 and be retained therein via a crimped cap 74A. The cable arrangement 74 also includes at least one second cable 94 having a first end 94-1 configured to accept, i.e., be acted on by, the actuation force F and a second end 94-2 extending into the housing 80 and connected to the mounting block 82. Each of the first and second cables 92, 94 may include an inner cable extending through a hollow longitudinally incompressible outer sheath. The inner cable may be a solid steel wire or multiple strands of wire twisted into a helix.

As shown in FIGS. 6-8, the at least one second cable 94 may include two individual second cables 94A and 94B, each connected to the mounting block 82. The two second cables 94A and 94B may each extend through the mounting block 82 and be retained therein via crimped caps 74A. The housing 80 may include a guide feature 80-1 configured to guide the shifting of the mounting block 82 relative to the housing. The guide feature 80-1 may be one or more rails incorporated, e.g., net formed, into the housing 80. The lockout mechanism 78 may additionally include a bias spring 96 configured to urge the stop lever 84 to pivot into contact with the mounting block 82. As shown, the bias spring 96 acts on the stop lever first end 84-1, while the cam lever 88 acts on the stop lever second end 84-2. The contact of the stop lever 84 with the mounting block 82 is configured to impede the shift of the mounting block and the shifting of the cable arrangement 74 relative to the housing 80. As shown, the bias spring 96 is arranged to operate between the housing 80 and the stop lever 84. The housing 80 may include a locating feature 98A, while the stop lever 84 may include a locating feature 98B. Each of the locating features 98A and 98B may be configured to extend into the respectively proximate end coil of the bias spring 96. Together, the locating features 98A and 98B are configured to position and preload the bias spring 96 within the housing 80.

The lockout mechanism 78 may additionally include an electric actuator 100. The electric actuator 100 may, for example, be an electric motor mounted externally to the housing 80, or an electromechanical device, such as a solenoid. The electric actuator 100 is configured to actuate or turn the cam lever 88 by imparting a torque T (shown in FIG. 8) to the keyed drive shaft 90. The torque T rotates a lobe 88A section of the cam lever 88 away from a stop lever first end 84-1, and thereby permits the stop lever 84 to pivot into contact with the mounting block 82 at a stop lever second end 84-2. As shown, the housing 80 includes a stop feature 102, while the cam lever 88 includes a section 88B configured to contact the stop feature. The stop feature 102 defines a limit position 104 of the cam lever 88 and its travel opposite to direction of the torque T.

The electric actuator 100 may be regulated via an electronic controller 106 (shown in FIG. 1). Specifically, the electronic controller 106 may be a body control module (BCM) or a stand-alone controller arranged in the vehicle 10. The electronic controller 106 may be programmed to actuate the lockout mechanism 78 in response to a predetermined operative condition of the vehicle 10, such as, for example, a sensed movement of the vehicle. In such an embodiment, the electronic controller 106 may be configured to trigger an algorithm 108 in response to received signal(s) from a variety of sensor(s) 110 arranged in the vehicle 10. Accordingly, the electronic controller 106 may be configured, i.e., structured and programmed, to trigger the lockout mechanism 78 via the electric actuator 100, and thereby prevent the release of the hood panel 44 from the first hood position P1 to the second hood position P2, for example when the vehicle 10 is in motion.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A vehicle comprising:
   a vehicle body defining a compartment;
   a panel configured to cover the compartment;
   a latch mechanism configured to selectively fasten the panel to the vehicle body such that the panel maintains closure of the compartment; and
   a cable release system configured to actuate the latch mechanism to unlatch the panel from the vehicle body, including:

a cable arrangement configured to shift in response to an actuation force and thereby actuate the latch mechanism; and a lockout mechanism configured to selectively impede shifting of the cable arrangement in response to the actuation force and thereby prevent actuation of the latch mechanism;

wherein the lockout mechanism includes:
  a housing configured to mount therein a shiftable mounting block;
  a pivotable stop lever; and
  a cam lever configured to maintain the stop lever from pivoting into contact with the mounting block; and wherein the cable arrangement includes:
  a first cable having a first end connected to the latch mechanism and a second end extending into the housing and connected to the mounting block; and
  at least one second cable having a first end configured to accept the actuation force and a second end extending into the housing and connected to the mounting block.

2. The vehicle of claim 1, wherein the at least one second cable includes two cables connected to the mounting block.

3. The vehicle of claim 1, wherein the housing includes a guide feature configured to guide a shift of the mounting block relative to the housing.

4. The vehicle of claim 1, wherein the lockout mechanism additionally includes a bias spring configured to urge the stop lever to pivot into contact with the mounting block to thereby impede the shift of the mounting block and the shifting of the cable arrangement relative to the housing.

5. The vehicle of claim 4, wherein the bias spring operates between the housing and the stop lever.

6. The vehicle of claim 5, wherein each of the housing and the stop lever includes a respective locating feature configured to position and preload the bias spring within the housing.

7. The vehicle of claim 4, wherein the stop lever includes a stop lever first end, a stop lever second end, and a pivot arranged between the stop lever first end and the stop lever second end, and wherein the bias spring acts on the stop lever first end, and the cam lever acts on the stop lever second end.

8. The vehicle of claim 1, wherein the lockout mechanism additionally includes an electric actuator configured to actuate the cam lever and thereby permit the stop lever to pivot into contact with the mounting block.

9. The vehicle of claim 1, wherein the housing includes a stop feature defining a limit position and travel of the cam lever.

10. A cable release system configured to actuate a latch mechanism, the cable release system comprising:

a cable arrangement configured to shift in response to an actuation force and thereby actuate the latch mechanism; and a lockout mechanism configured to selectively impede shifting of the cable arrangement in response to the actuation force and thereby prevent actuation of the latch mechanism;

wherein the lockout mechanism includes:
  a housing configured to mount therein a shiftable mounting block;
  a pivotable stop lever; and
  a cam lever configured to maintain the stop lever from pivoting into contact with the mounting block; and wherein the cable arrangement includes:
  a first cable having a first end connected to the latch mechanism and a second end extending into the housing and connected to the mounting block; and
  at least one second cable having a first end configured to accept the actuation force and a second end extending into the housing and connected to the mounting block.

11. The cable release system of claim 10, wherein the at least one second cable includes two cables connected to the mounting block.

12. The cable release system of claim 10, wherein the housing includes a guide feature configured to guide a shift of the mounting block relative to the housing.

13. The cable release system of claim 10, wherein the lockout mechanism additionally includes a bias spring configured to urge the stop lever to pivot into contact with the mounting block to thereby impede the shift of the mounting block and the shifting of the cable arrangement relative to the housing.

14. The cable release system of claim 13, wherein the bias spring operates between the housing and the stop lever.

15. The cable release system of claim 14, wherein each of the housing and the stop lever includes a respective locating feature configured to position and preload the bias spring within the housing.

16. The cable release system of claim 13, wherein the stop lever includes a stop lever first end, a stop lever second end, and a pivot arranged between the stop lever first end and the stop lever second end, and wherein the bias spring acts on the stop lever first end, and the cam lever acts on the stop lever second end.

17. The cable release system of claim 10, wherein the lockout mechanism additionally includes an electric actuator configured to actuate the cam lever and thereby permit the stop lever to pivot into contact with the mounting block.

18. The cable release system of claim 10, wherein the housing includes a stop feature defining a limit position and travel of the cam lever.

\* \* \* \* \*